Nov. 7, 1950 A. G. HERRESHOFF 2,529,392
SUPPORT FOR REAR AXLE DIFFERENTIALS
Filed Dec. 23, 1947
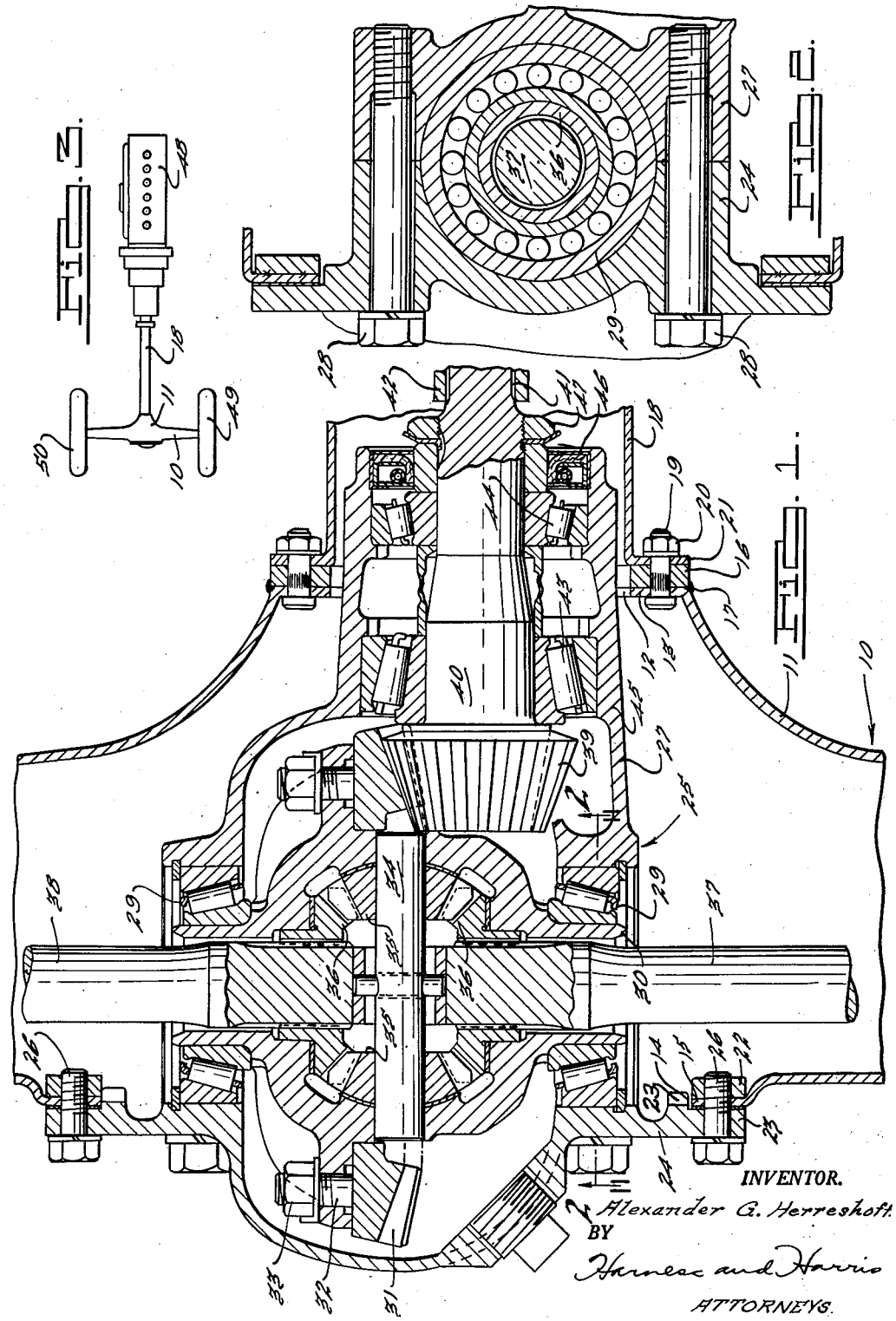
INVENTOR.
Alexander G. Herreshoff
BY
Harness and Harris
ATTORNEYS.

Patented Nov. 7, 1950

2,529,392

UNITED STATES PATENT OFFICE 2,529,392

SUPPORT FOR REAR AXLE DIFFERENTIALS

Alexander G. Herreshoff, Grosse Pointe, Mich., assignor to Chrysler Corporation, Highland Park, Mich., a corporation of Delaware Application December 23, 1947, Serial No. 793,467

9 Claims. (Cl. 74—713)

This application relates to an arrangement for supporting a differential-drive mechanism in a vehicle axle.

The proper design of the gears constituting a differential drive for vehicle wheels presents problems, because when these gears are supported in known manner in a housing containing axles connecting the gears and the vehicle wheels, the stresses imposed by the wheels through the housing on the gears are large and require the gears to be quite large.

I have solved this difficulty by supporting a carrier for the differential-drive gears in such a way that very little of the stress imposed on the axle housing is transmitted to the carrier and the gears. The support of the carrier is such that the carrier is so structurally independent of the axle housing as to make the gears independent of the axle housing. The gear carrier is thus made structurally rigid and provides more rigid support of the gears enabling them to be lighter.

An object of the present invention is to provide an improved arrangement of axle housing and differential-drive carrier.

Other objects will appear from the disclosure.

In the drawings:

Fig. 1 is a detail sectional view of a novel arrangement for supporting differential gears for a vehicle drive, according to the present invention;

Fig. 2 is a sectional view taken along the line 2—2 of Fig. 1; and

Fig. 3 is a schematic view of a portion of a vehicle showing the way in which the novel arrangement of the present invention is to be put to use.

The reference character 10 designates a rear axle housing of a vehicle. The axle housing has a bulge 11 at an intermediate portion on one side in which there is an opening 12 bordered by a flange 13. On the opposite side of an axle housing is an opening 14 bordered by a flange 15. The flange 13 is reinforced by a ring 16 secured to the flange 13 by soldering or welding indicated at 17. A tube 18 is secured to the axle housing 11 by bolts 19 and nuts 20. The bolts pass through flange 13, reinforcing ring 16, and a flange 21 formed on the tube 18.

The flange 15 is reinforced by a ring 22 bonded thereto by soldering or welding. A flange 23 on a member 24 forming part of a differential carrier 25 engages the flange 15, being secured thereto by screws 26. As seen in Fig. 2, the member 24 is secured to cooperating member 27 also forming part of the differential carrier 25, by screws 28. Between the carrier parts 24 and 27 is mounted a pair of conical roller bearings 29, which journal a case 30. A ring gear 31 is secured by bolts 32 and nuts 33 to the case 30. A stub shaft 34 is journalled in the case 30 and carries a pair of differential pinions 35 meshing with differential pinions 36 keyed to inner adjacent ends of axles 37 and 38. The ring gear 31 meshes with a pinion 39 formed on the end of a shaft 40 splined as indicated at 41 to one end of a drive shaft 42. Conical roller bearings 43 and 44 journal the shaft 40 in a sleeve-like extension 45 on the carrier part 27. A seal 46 is provided at the end of the sleeve-like extension 45. A nut 47 is threaded on the shaft 40 to hold the shaft in proper position in the sleeve-like extension 45. The drive shaft 42 is adapted to be driven through appropriate means, not illustrated in detail, by an engine 48. The outer ends of the axles 37 and 38 are suitably connected to wheels 49 and 50.

It is to be noted that, although the sleeve-like extension 45 projects from the axle housing 10 into the adjacent end of the tube 18, neither the sleeve-like extension 45 nor the remainder of the carrier part 27 is supported in the end of the tube 18 or in the flanged opening 12 on that side of the axle housing 10. Fig. 1 shows the sleeve-like extension 45 to be spaced from the tube 18 and the flange 12, to which the tube 18 is attached.

The differential carrier and the gears positioned therein are supported entirely at the rear side of the axle housing 10, i. e., by securement of the flange 23 of the carrier part 24 to the flange 15 surrounding the opening 14 at the rear side of the axle housing. Because the differential carrier 25 is supported at only one side of the axle housing, the differential carrier and the parts carried thereby are not subjected to the stress imposed upon the axle housing 10, for example, through the wheels 49 and 50. Thus the differential carrier is made rigid and can better support the gears therein, which may be made lighter, since they are subjected to smaller stresses.

I claim:

1. In an assembly comprising an axle housing having first and second openings at opposite sides, a shaft housing having one end detachably connected to the first opening in the axle housing, a drive shaft extending along and within the shaft housing, axles extending in opposite directions along and within the axle housing from the region of the first and second openings, means connecting an end of the drive shaft and adjacent ends of the axles in a differential drive, a structure comprising a sleeve-like portion projecting through said first opening into the shaft housing with predetermined lateral clearance at all points therealong and supporting said end of the drive shaft and a remaining portion supporting said adjacent ends of the axles and the differential-drive means and passing through the second opening, the combination therewith, of means attaching and supporting the said structure only to and on the region of the axle housing surrounding the second opening.

2. In an assembly comprising an axle housing having first and second openings at opposite sides, a shaft housing having one end connected to the first opening in the axle housing, a shaft extending along and within the shaft housing and having one end in the axle housing, axles extending in opposite directions along and within the axle housing from the region of the first and second openings, means connecting the said one end of the shaft and adjacent ends of the axles in a differential drive, a structure supporting said end of the shaft and said adjacent ends of the axles and the differential-drive means and projecting into the said one end of the shaft housing in spaced relation thereto, the combination therewith, of means attaching and supporting the said structure only to and on the region of the axle housing surrounding the second opening.

3. In an assembly comprising an axle housing having first and second openings at opposite sides, a shaft housing having one end detachably connected to the first opening in the axle housing, a drive shaft extending along and within the shaft housing, axles extending in opposite directions along and within the axle housing from the region of the first and second openings, means connecting an end of the drive shaft and adjacent ends of the axles in a differential drive, a structure supporting said end of the drive shaft and said adjacent ends of the axles and the differential-drive and having an attaching flange near one end extending outwardly beyond the rest of the structure, the combination therewith of means attaching the flange only to the regions of the axle housing surrounding the second opening on the outer side of the axle housing, the structure being free of attachment and support to and on the shaft housing and free of attachment and support to and on the axle housing other than by attachment of the flange as aforesaid.

4. In an assembly comprising an axle housing having an opening in one side, a shaft housing having one end connected to the said opening in the axle housing, a drive shaft extending along and within the shaft housing and having a near end in said one end of the shaft housing, an extension shaft attached to said near end of the drive shaft and extending therefrom through said opening, a journal bearing span for the extension shaft disposed to lie on either side of the said opening, a seal on the extension shaft between the bearing span and near end of the drive shaft, axles extending along and within the axle housing in opposite directions from the region of the said opening, means connecting the extension shaft and adjacent ends of the axles in a differential drive, a structure supporting said bearing span and seal, said adjacent ends of the axles, and the differential-drive means, the combination therewith, of means providing the sole support for the said structure, the disposition of said means being confined to the side of the axle housing opposite the said opening.

5. In an assembly comprising an axle housing having an opening in one side, a shaft housing having one end connected to the said opening in the axle housing, a drive shaft extending along and within the shaft housing and having an end in the axle housing, axles extending along and within the axle housing in opposite directions from the region of the said opening, means connecting an end of the drive shaft and adjacent ends of the axles in a differential drive, a structure supporting said end of the drive shaft, said adjacent ends of the axles, and the differential-drive means and extending into the said one end of the shaft housing in spaced noncontacting relation thereto, the combination therewith of means attaching and supporting the said structure only to and on the side of the axle housing opposite the said opening.

6. An assembly comprising the combination with an axle housing having an opening in one side, a drive shaft projecting generally transversely to the axle housing including a splined terminal portion and having associated therewith an attached extension shaft extending from said terminal portion through said opening to an upset end thereof, said upset end being provided with gear teeth formed thereon, axles extending along and within the axle housing in opposite directions from the region of the said opening, means drivingly connecting the gear teeth of the extension shaft and adjacent ends of the axles in a differential drive, and a structure supporting the extension shaft radially free of the opening together with the said adjacent ends of the axles and the differential-drive mechanism, of means attaching and supporting the said structure only to and on the side axle housing opposite the said opening.

7. In an assembly, an axle housing, a drive shaft extending generally transversely to the axle housing and having a splined end adjacent the axle housing and having a sleeve-like extension passing freely through said opening in unrestrained relation, said extension shaft being journalled in said sleeve-like extension on either side of said opening in a manner to find axial restraint in either direction therein and transverse restraint thereby independent of said housing adjacent said opening, and axles extending along and within the axle housing in opposite directions from the region adjacent said upset end, means connecting the said end of the extension shaft and adjacent ends of the axles in a differential drive, a structure supporting said adjacent ends of the axles and the differential-drive means and having a sleeve-like extension passing freely through said opening in unrestrained relation, said extension shaft being journalled in said sleeve-like extension on either side of said opening in a manner to find axial restraint in either direction therein and transverse restraint thereby independent of said housing adjacent said opening, and means attaching and supporting the said structure only to and on one side of the axle housing.

8. In an assembly comprising an axle housing having first and second openings at opposite sides, an input shaft projecting generally transversely of the axle housing into the first opening and having one end in the region between the first and second openings, axles extending along and within the axle housing in opposite directions from the region of the first and second openings, means connecting the said end of the input shaft and adjacent ends of the axles in a differential drive, a structure including thrust bearings on either side of the first opening for supporting the said end of the shaft and further disposed in normal tangency to the plane of the second opening for supporting the said adjacent ends of the axle and the differential-drive mechanism, the combination therewith, of means attaching and supporting the said structure only to and on the portions of the axle housing surrounding the second opening.

9. In an assembly comprising an axle housing having first and second openings at opposite sides, an input shaft extending generally transversely of the axle housing and having an end projecting into the first opening, axles extending along and within the axle housing in opposite directions from the region of the first and second openings, means connecting the said end of the input shaft and adjacent ends of the axles in a differential drive, a structure supporting the said adjacent ends of the axle and the differential-drive mechanism and having annular webs extending outwardly beyond the remainder of the structure to locations one adjacent the first opening and another adjacent the second opening, the annular web adjacent the first opening being removed from any restrictive engagement therewith and having means in association with itself for supporting the said end of the input shaft, the annular web adjacent the second opening having means associated therewith for supporting the said structure on the axle housing only by attaching the last named web to the outer side of the portions of the axle housing surrounding the second opening.

ALEXANDER G. HERRESHOFF.

REFERENCES CITED

The following references are of record in the file of this patent:

UNITED STATES PATENTS

| Number | Name | Date |
|---|---|---|
| 989,689 | Berger | Apr. 18, 1911 |
| 1,002,858 | McCue | Sept. 12, 1911 |
| 1,076,560 | Duffy | Oct. 21, 1913 |
| 1,331,662 | Neuteboom | Feb. 24, 1920 |

FOREIGN PATENTS

| Number | Country | Date |
|---|---|---|
| 133,191 | Great Britain | Oct. 9, 1919 |
| 155,196 | Great Britain | Apr. 6, 1922 |